United States Patent
Sorin et al.

(10) Patent No.: US 9,635,362 B2
(45) Date of Patent: Apr. 25, 2017

(54) SYSTEM AND METHOD FOR THE DYNAMIC REDUCTION OF THE ENTROPY OF A SIGNAL UPSTREAM TO A DATA COMPRESSION DEVICE

(71) Applicant: ENVIVIO FRANCE, Saint Jacques de la Lande (FR)

(72) Inventors: Marine Sorin, Rennes (FR); Thomas Guionnet, Rennes (FR); Jean Kypreos, Betton (FR); Guillaume Hervouet, Rennes (FR)

(73) Assignee: ENVIVIO FRANCE, Saint Jacques de la Lande (FR)

( * ) Notice: Subject to any disclaimer, the term of this patent is extended or adjusted under 35 U.S.C. 154(b) by 355 days.

(21) Appl. No.: 14/181,242

(22) Filed: Feb. 14, 2014

(65) Prior Publication Data
US 2014/0226724 A1    Aug. 14, 2014

(30) Foreign Application Priority Data
Feb. 14, 2013    (FR) ...................... 13 51277

(51) Int. Cl.
  *H04B 1/66*    (2006.01)
  *H04N 7/12*    (2006.01)
  (Continued)

(52) U.S. Cl.
  CPC ......... *H04N 19/117* (2014.11); *H04N 19/137* (2014.11); *H04N 19/14* (2014.11);
  (Continued)

(58) Field of Classification Search
  USPC .......................... 375/240.16, 240.04, 204.06
  See application file for complete search history.

(56) References Cited

U.S. PATENT DOCUMENTS

| | | | |
|---|---|---|---|
| 2010/0008417 A1* | 1/2010 | Xu | H04N 19/147 375/240.02 |
| 2011/0002554 A1* | 1/2011 | Uslubas | H04N 19/176 382/238 |
| 2011/0228840 A1 | 9/2011 | Yamori | |

FOREIGN PATENT DOCUMENTS

| | | |
|---|---|---|
| EP | 2109322 A2 | 10/2009 |
| EP | 2144446 A2 | 1/2010 |

OTHER PUBLICATIONS

Hu et al. S. Hu, H. Wang, S. Kwong and T. Zhao, "Frame level rate control for H.264/AVC with novel Rate-Quantization model," Multimedia and Expo (ICME), 2010 IEEE International Conference on, Suntec City, Jul. 19-23, 2010, pp. 226-231. doi: 10.1109/ICME.2010.5583038.*

(Continued)

*Primary Examiner* — Christopher S Kelley
*Assistant Examiner* — Ana Picon-Feliciano
(74) *Attorney, Agent, or Firm* — David D. Brush; Westman, Champlin & Koehler, P.A.

(57) ABSTRACT

A system is proposed for dynamic reduction of the entropy of a signal upstream to a data compression device. The signal includes a set of successive frames. The system has a filtering decision module that provides a setpoint value of filtering and a filtering module that filters the signal according to the setpoint value of filtering and gives a filtered signal to the data compression device. The system further includes a module for obtaining a piece of information on complexity for each frame of the signal. The filtering decision module is adapted to determining the setpoint value of filtering, for each frame of the signal, as a function inter alia of the piece of information on complexity.

14 Claims, 3 Drawing Sheets

Figure 1:
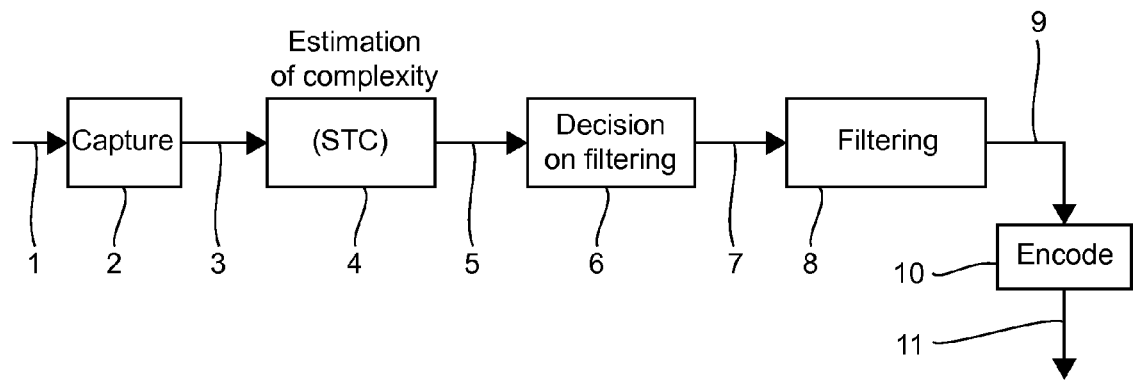

(51) Int. Cl.
| | |
|---|---|
| *H04N 11/02* | (2006.01) |
| *H04N 11/04* | (2006.01) |
| *H04N 19/117* | (2014.01) |
| *H04N 21/2662* | (2011.01) |
| *H04N 19/176* | (2014.01) |
| *H04N 19/14* | (2014.01) |
| *H04N 19/137* | (2014.01) |
| *H04N 19/19* | (2014.01) |

(52) U.S. Cl.
CPC ............ *H04N 19/176* (2014.11); *H04N 19/19* (2014.11); *H04N 21/2662* (2013.01)

(56) References Cited

OTHER PUBLICATIONS

Serhan Uslubas et al., "A Resolution Adaptive Video Compression System," Studies in Computational Intelligence, vol. 280, Jan. 1, 2010 (Jan. 1, 2010), pp. 167-194, XP009174234.

Jens-Rainer Ohm et al., "Comparison of the Coding Efficiency of Video Coding Standards Including High Efficiency Video Coding (HEVC)," IEEE Transactions on Circuits and Systems for Video Technology, IEEE Service Center, Piscataway, NJ, US, vol. 22, No. 12, Dec. 1, 2012 (Dec. 1, 2012), pp. 1669-1684, XP011487150, ISSN: 1051-8215, DOI: 10.1109/TCSVT.2012.2221192.

Wiegand T. et al., "Rate-constrained coder control and comparison of video coding standards," IEEE Transactions on Circuits and Systems for Video Technology, IEEE Service Center, Piscataway, NJ, US, vol. 13, No. 7, Jul. 1, 2003, (Jul. 1, 2003), pp. 688-703, XP011099260, ISSN: 1051-8215, DOI: 10.1109/TCSVT.2003.815168.

Sullivan G.J. et al., "Rate-distortion optimization for Video Compression," IEEE Signal Processing Magazine, IEEE Service Center, Piscataway, NJ, US, vol. 15, No. 6, Nov. 1, 1998 (Nov. 1, 1998), pp. 74-90, XP011089821, ISSN: 1053-5888, DOI: 10.1109/79.733497.

Jie Dong and Yan Ye, "Adaptive Downsampling for High-definition Video Coding," InterDigital Communications, San Diego, CA, 2012, ISBN: 978-1-4673-2533-2.

French Search Report and Written Opinion dated Dec. 11, 2013 for corresponding French Application No. 1351277, filed Feb. 14, 2013.

English Translation of the French Written Opinion dated Dec. 11, 2013 for corresponding French Application No. 1351277, filed Feb. 14, 2013.

\* cited by examiner

SYSTEM AND METHOD FOR THE DYNAMIC REDUCTION OF THE ENTROPY OF A SIGNAL UPSTREAM TO A DATA COMPRESSION DEVICE

1. FIELD OF THE INVENTION

The field of the invention is that of data compression (compression of audio and/or video data).

More specifically, the invention relates to a technique for the dynamic reduction of the entropy of a signal upstream to a data compression device (also called an encoder).

One particular embodiment proposes a real-time, bit-rate/time constrained encoder.

2. TECHNOLOGICAL BACKGROUND

In the present description, a frame is defined as a set of successive items of data and a scene is defined as a set of successive frames. In the particular case of video, a frame is an image.

The quantity of information (entropy) contained in a signal can vary hugely over time. For example, in the case of a video signal, it is possible to pass from a static scene containing smooth textures to a scene comprising many moving objects and complex textures. In this case, a significant increase is observed in the complexity of the scene and in the quantity of information.

When compression techniques are used, this natural variation has two consequences:
  first of all, the data bit rate generated by the encoder varies according to the scene;
  then, depending on the application strategy chosen, the subjective video quality of the scene at output from the encoder can vary.

Solutions have been developed to overcome these two problems.

There are known techniques, called bit-rate control techniques used to regulate the output bit rate of the encoder. It is possible to ensure either a constant bit rate (CBR) or a variable bit rate (VBR). In both cases, an external constraint, for example the physical capacity of a communications channel. Is met. If this external constraint varies over time, then this is a variable bit rate (VBR).

Techniques are also known for the dynamic reduction of the entropy of the signal upstream to the encoder. These techniques (which can be used jointly with the above-mentioned bit-rate control techniques) rely on the use, upstream to the encoder, of:
  a filtering decision module which provides a filtering setpoint value,
  and a filtering module (also called a filter) which filters the signal according to the filtering setpoint value and gives a filtered signal to the encoder.

A filter is defined as a module that converts the frames of a scene by applying an operator. In the present description, the filters considered are aimed at reducing the entropy of the frames. However, one drawback of these filters is that the video quality of the frames (at output from the encoder) is degraded.

To ensure a minimum subjective video quality at output from the encoder, a first known solution (the simplest solution) is described in a first part (see paragraph 1.2) of the following article: Serhan Uslubas, Ehsan Maani and Aggelos K. Katsaggelos, "A Resolution Adaptive Video Compression System", (North Western University, Department of EECS).

This first known solution consists of a systematic filtering of the applied filter. In the case of this article, the filter is a resizing (reduction of the encoding resolution).

However, this first known solution is sub-optimal since the resolution chosen could be increased for most of the scenes (the scenes of low complexity are not rendered in full resolution). Conversely if the chosen resolution is too high, it can happen that certain scenes do not reach the minimum level of quality expected at output from the encoder: there is a risk that there will be artifacts of undesirable quality (blockiness, frozen images, etc). It can then be decided to increase the bit rate of the encoder but in this case the efficiency of the compression is limited or an external constraint is not met.

To improve the flexibility of their first approach, the authors of the above-mentioned article propose a second solution described in a second part of the article (see paragraphs 2.1, 2.2 and 2.3). The principle of the second known solution is the following: for each block of each frame, the system carries out two encoding operations, one in high resolution (encoding of the original block) and the other in low resolution (encoding of a filtered block obtained by reducing the resolution). Then, the system selects one of the two encodings in taking the rate-distortion (RD) cost as the criterion.

This second known solution is efficient but not optimal for the following reasons:
  the proposed system integrates a double encoding, which remains a costly solution. Furthermore, the decision on resolution is taken for each block of each frame and the criterion used (rate-distortion (RD) cost) has a cost which is high. This second solution significantly increases the encoding time;
  in a same frame, blocks are encoded in full resolution (high resolution) and others have undergone resizing. This process compromises the homogeneity of the quality of the frame at output from the encoder.

A third known solution is described in the article by Jie Dong and Yan Ye, "Adaptive Downsampling for High-Definition Video Coding", (InterDigital Communications, San Diego, Calif.). It improves the second known solution by applying a resizing (downsampling) of the entire frame, the chosen resizing being the one that gives the best balance between two estimated distortions (distortion related to encoding and distortion related to resizing), and therefore that which achieves the best overall performance in terms of rate-distortion (RD) cost.

It thus resolves the problem of homogeneity of filtering. However, the third known solution is not complete for the following reasons:
  the module which gives optimal resolution cannot be used to obtain it automatically. The authors do not propose a generic solution that can be carried out on a real-time product but a case-by-case solution;
  the formula for estimating the distortion related to the encoding is theoretical: it is not re-applicable because the way in which the parameters are obtained is unexplained.

3. GOALS OF THE INVENTION

The invention, in at least one embodiment, is aimed especially at overcoming these different drawbacks of the prior art.

More specifically, it is a goal of at least one embodiment of the invention, to provide a technique for the dynamic reduction of the entropy of a signal upstream to a data compression device (encoder) enabling the dynamic adaptation of the filtering of the frames of the signal before encoding, in order to increase the tolerance of an encoder to variations of complexity of a scene while at the same time ensuring minimum quality at the output from the encoder.

It is another goal of at least one embodiment of the invention to provide a technique of this kind enabling an upstream implementation of a real-time encoder complying with a constant bit rate (CBR).

It is an additional goal of at least one embodiment of the invention to provide a technique of this kind that can be implemented whatever the format of the signal output from the capture module.

It is an additional goal of at least one embodiment of the invention to provide a technique of this kind that is simple to implement and costs little.

4. SUMMARY OF THE INVENTION

One particular embodiment of the invention proposes a system for the dynamic reduction of the entropy of a signal upstream to a data compression device, said signal comprising a set of successive frames, said system comprising a filtering decision module that provides a setpoint value of filtering and a filtering module that filters the signal according to said setpoint value of filtering and gives a filtered signal to the data compression device. The system comprises a module for obtaining a piece of information on complexity for each frame of the signal, and said filtering decision module is adapted to determining said setpoint value of filtering for each frame of the signal as a function inter alio of said piece of information on complexity.

The general principle of the invention therefore consists in obtaining a piece of information on complexity for each frame of a signal and in using this piece of information in a decision-making process which (by filtering) adaptively reduces the entropy of this signal in order to meet the constraints of bit rate and quality expected at output of the compression device (encoder).

Thus, this particular embodiment of the invention relies on a wholly novel and inventive approach:
- contrary to the first solution, there is no systematic filtering;
- contrary to the second known solution, there is no decision for each block of each frame and no use of the "rate distortion cost" criterion;
- contrary to the third known solution, there is no use of the "rate distortion cost" criterion (there is no search for the best balance between an estimation of the distortion related to the encoding and an estimation of the distortion related to the resizing).

In a first particular application of the system, the setpoint value of filtering is a setpoint value of resolution and the filtering module is adapted to carrying out a resizing of each frame according to said setpoint value of resolution.

In a second particular application of the system, the setpoint value of filtering is a setpoint value of filtering strength and the filtering module is adapted to carrying out a low-pass filtering of each frame according to said setpoint value of filtering strength.

In a first particular implementation of the module for obtaining information on complexity, the module for obtaining information on complexity comprises means for estimating complexity adapted to determining an estimated complexity K(t) associated with a frame I(t) and said filtering decision module is adapted to determining said setpoint value of filtering for the frame I(t) as a function inter alio of said estimated complexity K(t).

Thus, in this first implementation, the information on complexity of a frame I(t) is an estimated complexity. If the estimation module is appropriately chosen (cf. especially in the particular case described here below), the estimation of the complexity can be done in real time and the present technique can then be implemented upstream relative to real-time data compression device (encoder).

According to one particular characteristic, said estimated complexity K(t) is defined by:

$$K(t) = Q_{step} \times \frac{1}{A} \times \sum_{k=t}^{t+N} \sum_{T \in E_{Type}} (P(\text{Type } I(k) = T) \times C_{frame=T}(k))$$

with:
Qstep being a determined quantization step;
A being a standardization factor;
$E_{Type}$={inter (P), intra (I), bi-predicted inter (B), bi-predicted and reference inter (Bref)}, is the set of a possible encoding types, i.e. the set of possible values of the variable T;
P(Type I(k)=T) is the probability that a frame I(k) is of a T type;
$C_{frame=T}(k)$ is an estimated cost of a frame I(k) of a T type; and
0≤N≤N max, N being the number of next frames I(t+1) to I(t+N), used with the frame I(t) to compute the estimated complexity K(t) of the frame I(t).

This mode of estimation is compatible with a real-time implementation.

According to one particular characteristic, said estimated cost C(t) of the frame I(t) is defined by:

$$C_{frame=T} = \sum_{blk=0}^{Nblock} C_{Block|T}(blk)$$

with:
$C_{Bloc|T}(blk)$ being the estimated cost of a block blk included in the frame I(t) and the encoding type T of which is included in the group comprising: "intra", "inter", "bi-predicted inter" and "bi-predicted and reference inter"; and
N bloc is the number of blocks included in the frame I(t).

According to one particular characteristic, said estimated cost $C_{block|T}$ of a block blk is defined by:

$C_{Block|T}(blk) = P(blk=\text{tempo}) \times C_{tempo}(blk) + (1-P(blk=\text{tempo})) \times C_{spatio}(blk)$ with:
$C_{tempo}$ is a cost of encoding with a temporal prediction for the block blk;
$C_{spatio}$ is a cost of encoding with a spatial prediction for the block blk;
P(blk=tempo) is the probability that the block blk is encoded with a temporal prediction.

According to one particular characteristic, said cost $C_{tempo}$ is defined by:

$$C_{tempo}(blk) = \alpha \times \frac{SAD(blk)}{Qstep} + \lambda \times MVCost(blk)$$

with:
- α and λ being predetermined parameters;
- MV Cost (blk) being a cost of prediction of a motion vector for the block blk;
- SAD (blk) being a error of prediction of a motion vector for the block blk.

According to one particular characteristic, the cost $C_{spatio}$ is defined by:

$$C_{spatio}(blk) = \beta \times \frac{\text{Energy}(blk)}{Qstep}$$

with:
- β being a predetermined parameter;
- Energy (blk) being a measurement of spatial energy for the block blk.

According to one particular characteristic, said probability P(blk=tempo) is a function of SAD(blk) and the type T of encoding of the frame I(t) in which the block blk is included, and is defined by:

$$P(blk=tempo|SAD(blk),Frame=I)=0$$

$$P(blk=tempo|SAD(blk),Frame=B)=1$$

Or $$P(blk = \text{tempo} | SAD(blk), \text{Frame} = B) = e^{-\frac{SAD^{\gamma'}}{\sigma'}}$$

$$P(blk = \text{tempo} | SAD(blk), \text{Frame} = P \text{ or Frame} = Bref) = e^{-\frac{SAD^{\gamma}}{\sigma}}$$

with:
- Frame=I, if the frame I(t) is an "intra" frame;
- Frame=P, if the frame I(t) is an "inter" frame;
- Frame=B, if the frame I(t) is a "bi-predicted inter" frame;
- Frame=Bref, if the frame I(t) is a "bi-predicted and reference inter" frame;
- γ', σ', γ and σ are predetermined parameters.

In a second particular implementation of the module for obtaining information on complexity, the module for obtaining information on complexity comprises an encoding module enabling the computation of the complexity associated with a frame I(t) by computing the number of bits really necessary for encoding the frame I(t) and said filtering decision module is adapted to determining said setpoint value of filtering for a frame I(t) as a function inter alio of the complexity computed.

Thus, in this second implementation, the information on complexity of a frame I(t) is a computed complexity. This computation requires encoding which is added to the encoding performed by the data compression device. There is therefore a double encoding (double-pass encoding) not compatible with a real-time implementation.

In a third particular implementation of the module for obtaining information on complexity, the module for obtaining information on complexity comprises:
- a reading module, for reading, in said signal, a first piece of information specifying the size C(t) of a frame I(t) and a second piece of information specifying a quantization step Qstep;
- a module for computing the complexity associated with the frame I(t) by multiplying the size read C(t) by the quantization step Qstep.

Thus, in this third mode of implementation, the information on complexity of a frame I(t) is a complexity obtained simply by combining (by multiplication) two pieces of information read in the signal: one pertaining to the size of the frame and the other to the quantization step. This is a low-cost solution but is restricted to situations where the received signal is an already compressed signal (which will be decoded and then re-encoded in a different format or at a different bit rate). The two pieces of information read are reliable only if the signal (compressed stream) has not preliminary undergone different successive encoding operations.

Another embodiment of the invention proposes a method for the dynamic reduction of the entropy of a signal upstream to a data compression device, said signal comprising a set of successive frames, said method comprising a step for filtering the signal according to a setpoint value of filtering, the filtered signal resulting from said filtering being given to the data compression device. The method comprises the following steps for each frame of the signal: obtaining a piece of information on complexity and determining the setpoint value of filtering as a function inter alio of the piece of information on complexity.

Advantageously, the method comprises steps implemented within the system as described here above in any one of its different embodiments.

In a first particular application of the method, the setpoint value of filtering is a setpoint value of resolution and the filtering step comprises a resizing of each frame according to said setpoint value of resolution.

In a second particular application of the method, the setpoint value of filtering is a setpoint value of filtering strength and the filtering step comprises a low-pass filtering of each frame according to said setpoint value of filtering strength.

Another embodiment of the invention proposes a computer program product comprising program code instructions to implement the above-mentioned method (in any one of its different embodiments) when said program is executed on a computer.

Another embodiment of the invention proposes a computer-readable, non-transient storage medium storing a computer program comprising a set of executable instructions executable by a computer to implement the above-mentioned method (in any one of its different embodiments).

5. LIST OF FIGURES

Figure 2:
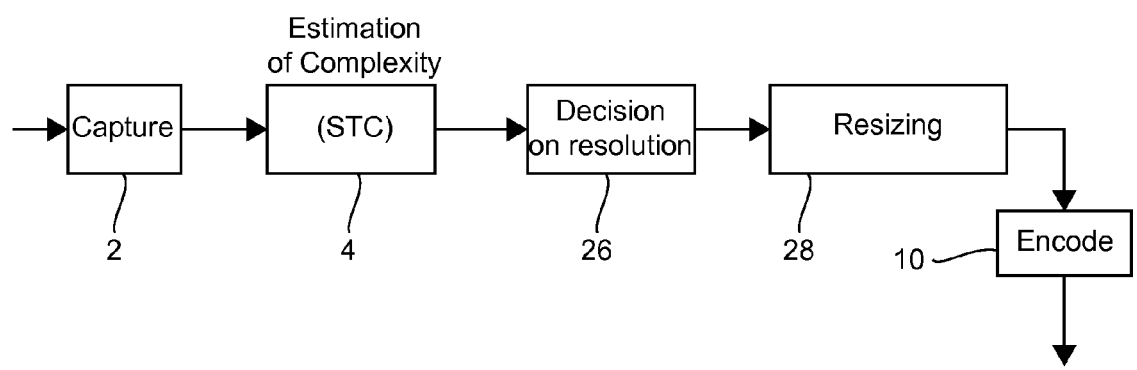
Figure 3:
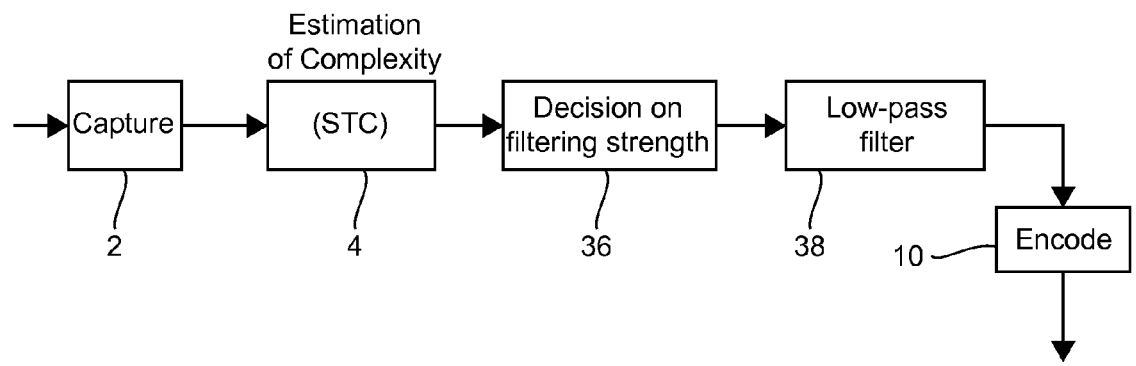
Figure 4:
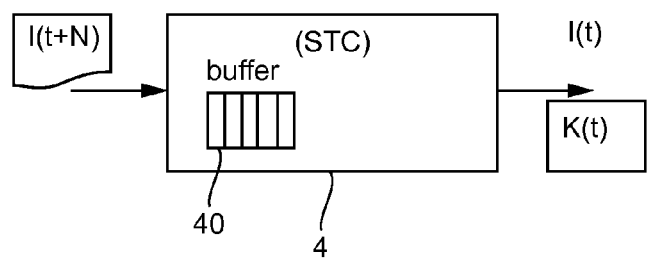
Figure 5:
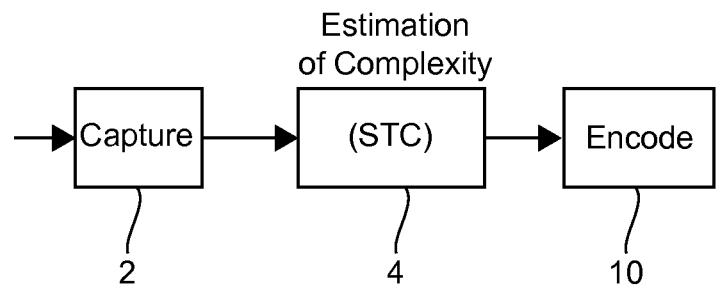
Figure 6:
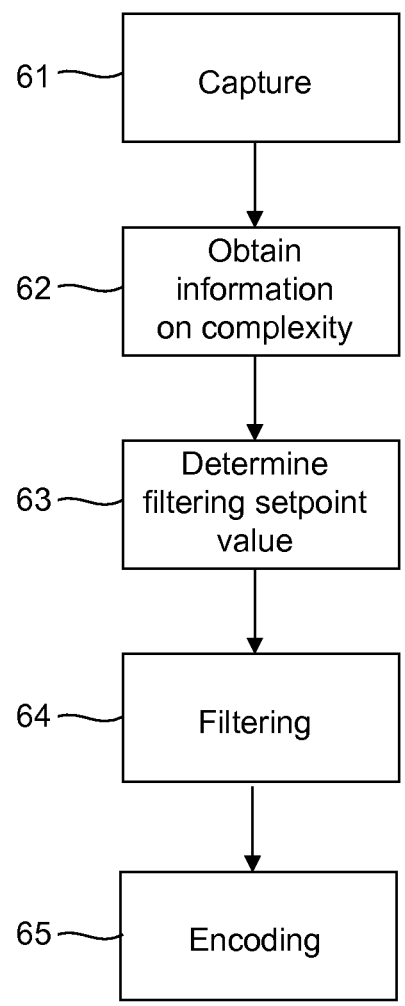

Other features and advantages of the invention shall appear from the following description given by way of an indicative and non-exhaustive example and from the appended figures, of which:

FIG. 1 presents a generic view of a system according to the invention for the dynamic reduction of the entropy of a signal upstream to an encoder;

FIG. 2 presents a first application of the system of FIG. 1 in which the dynamic reduction of the entropy consists of a resizing (dynamic control of the encoding resolution);

FIG. 3 presents a second application of the system of FIG. 1 in which the dynamic reduction of the entropy consists of a low-pass filtering;

FIG. 4 specifies the inputs and outputs of the module for estimating complexity (STC) seen in FIGS. 1 to 3;

FIG. 5 presents a system, according to the invention, for decision assistance upstream to an encoder;

FIG. 6 shows a flowchart of a particular embodiment of a method according to the invention for the dynamic reduction of the entropy of a signal upstream to an encoder.

6. DETAILED DESCRIPTION

In all the figures of the present document, the identical elements and steps are designated by a same numerical reference.

Here below in the description, we consider by way of an example the particular case of the compression of a video signal (in this case the successive frames are images). The encoder (data compression device) used (referenced 10 in the figures) is for example an H.264/MPEG4-10 AVC encoder.

6.1 General Principle

As illustrated in FIG. 1, upstream to the encoder 10, the system according to a particular embodiment of the invention for the dynamic reduction of entropy (the working of which is illustrated in FIG. 6) comprises:

- a capture module 2 (made for example in the form of a card or an apparatus) which captures the frames of the signal 1 at input and converts them (reference signal 3) into a signal 3 possessing a format usable by the encoder 10 (step 61 of FIG. 6). For example, a video input can be in the SDI format and the corresponding output in the YUV "raw" format. The capture module 2 gives a video with a maximum resolution M_full× N_full. The frames are transmitted one by one to the following modules;
- a module 4 for obtaining a piece of information on complexity for each frame. It gives the next module (filter decision module 6) a piece of information on complexity 5 for each frame (step 62 of FIG. 6). Here below in the description, we provide a detailed view of an example of an embodiment in which this module 4 is a module for estimating complexity (or STC or spatial temporal complexity) module;
- a filter decision module 6 which decides on the optimal filtering according to the information on complexity received 5 and the bit rate of the encoder (step 63 of FIG. 6). For each frame, it receives information on complexity at input and gives a setpoint value 7 to the following module (filtering module 8). It makes a compromise between reduction of entropy and preservation of video quality. It chooses to carry out the least possible filtering without risk of compression artifacts (due to entropy excessive for the bit rate of the encoder). This module is described in detail here below;
- a filter module 8 which applies the filtering according to the setpoint values 7 decided by the filter decision module 6 (step 64 of FIG. 6). It gives the encoder 10 a filtered signal 9.

The encoder 10 sends out a compressed signal 11 comprising frames compressed in the resolution fixed by the process implemented by the system for the dynamic reduction of entropy (step 65 of FIG. 6). The resolution can vary from one frame to another without interruption of the process. The encoder is capable of adapting to changes in resolution and gives the information on change of resolution in the compressed data. The encoder is for example synchronized with a discrete clock. This clock is adjusted to the frequency of the frames. For example, at 25 frames per second, the clock gives a "beep" every 40 ms. These clock beeps are indexed by the variable t.

The different modules (referenced 2, 4, 6 and 8) included in the system for the system for dynamic reduction of entropy are carried out by computer, with one or more hardware elements (memory components and processors in particular) and/or software elements (programs). Each module comprises for example a RAM, a processing unit fitted for example with a processor and driven by a computer program stored in a ROM. At initialization, the code instructions of the computer program are for example loaded into the RAM and then executed by the processor of the processing unit. This is only one way, among several possible ways, to carry out the different algorithms described in detail here below. Indeed, each module is done indifferently on a reprogrammable computing machine (a PC, a DSP processor or a microcontroller) executing a program comprising a sequence of instructions or on a dedicated computing machine (for example a set of software gates such as the FPGA or an ASIC, or any other hardware module). In the case of an implementation on a reprogrammable computing machine, the corresponding program (i.e. the sequence of instructions) could be stored in a storage medium that may be detachable (such as for example a floppy disk, a CD ROM or a DVD ROM) or not detachable, this storage medium being partially or totally readable by a computer or a processor.

6.2 First Particular Application

Referring now to FIG. 2, we present a first application of the system according to FIG. 1 in which the dynamic reduction of the entropy consists of a resizing (dynamic control of the encoding resolution).

In the case of classic encoding with a given bit rate, the simplest known solution consists in choosing a fixed resolution. This resolution is fixed to ensure accurate quality for most of the sequences. However, it will be sub-optimal (undersized) for the easier sequences and doubtless excessively high (oversized) for the difficult sequences.

In the first application of the system of FIG. 1, it is sought for a given bit rate to obtain an optimal resolution which is dynamic, i.e. a resolution that varies according to the complexity of the frames.

In this first application, the filter decision module 6 and the filter module 8 of FIG. 1 are a module for deciding on resolution (or resolution decision module) 26 (for each frame, it gives an optimum resolution according to the information on complexity and the bit rate) and a resizing module 28 (for each frame, it applies a resizing according to the optimal resolution given by the module for deciding on resolution 26).

A detailed description is given now of an example of operation of the resolution decision module 26. The higher the resolution, the clearer is the output frame. However, the higher the resolution, the greater is the entropy of the frame and the greater the risk of artifacts of compression in the video at output from the encoder is high (blockiness, frozen images, etc). Using the previously computed complexity, the resolution decision module 26 chooses the highest resolution without causing any risk of compression artifacts.

In one particular embodiment, a table is built beforehand. This table gives a particular resolution for a given bit rate of the encoder (the table comprises pairs each associating a resolution and a bit rate). This is an average resolution that is appropriate to a scene of average complexity. The resolution decision module 26 uses for example this table in the following way, for each frame:

- if the information on complexity 5 (given by the complexity estimation module 4) indicates an estimated complexity that is lower than or equal to the average complexity, the filtering decision module chooses an optimal resolution that is the resolution associated, in the table, with the bit rate of the encoder;

if the information on complexity 5 (given by the complexity estimation module 4) indicates an estimated complexity that is greater than the average complexity, the filter decision module chooses an optimal resolution that is the resolution associated, in the table, with the bit rate that is immediately lower (among the bit rates contained in the table) than the bit rate of the encoder. Thus, the filter decision module chooses an optimal resolution that is lower than the average resolution associated with the bit rate of the encoder.

6.3 Second Particular Application

Referring now to FIG. 3, we present a second application of the system of FIG. 1 in which the dynamic reduction of the entropy consists of a low-pass filtering.

The entropy of a source is the average quantity of information contained in this source. The greater the entropy, the greater is the number of bits needed for the encoding. In the case of lossy encoding, a part of the information is not rendered. It is chosen to eliminate a part of the information before the encoding so that this encoding can render more important data.

In this second application, the filtering decision module 6 and the filtering module 8 of FIG. 1 are respectively a filtering strength decision module 36 (for each frame it gives an optimal value of filtering strength according to the information on complexity, the resolution of the scene and the encoding bit rate) and a low-pass filtering module 38 (for each frame it applies a low-pass filtering according to the optimal filtering strength given by the filtering strength decision module 36).

This process integrates a low-pass filter 38 upstream to the encoder 10 because the high frequencies necessitate more bits in the encoding process and are not necessarily visible to the human visual system. It is sometimes preferably to eliminate them to prevent encoding artifacts (blockiness, frozen image, etc). However, a low-pass filter induces an undesirable fuzzy effect when this filtering is not necessary.

A detailed description is now given of an example of operation of the filtering strength decision module 36. Depending on the encoding bit rate R, the resolution S of the scene and the complexity K(t) of the frames to be encoded, the filtering strength decision module 36 determines the strength F(t) of the low-pass filter to be applied to the frame I(t):

$$F(t)=\text{function}(R,S,K(t))$$

The average bit-rate/resolution table described in the above paragraph (pertaining to the first particular application) is also used here.

Here is an example of such a table:

| Resolution: S | Average bit rate: R (kbps) |
|---|---|
| 1280 × 720@25 fps | 2500 |
| 1024 × 576@25 fps | 1800 |
| 960 × 544@25 fps | 1600 |
| 854 × 480@25 fps | 1550 |
| 704 × 396@25 fps | 1150 |
| 640 × 360@25 fps | 950 |
| 512 × 288@25 fps | 700 |

Let Km be an average complexity that is set, for example, by being given the following value: $K_m=1000$.

The strength F(t) is computed for example according to the following method.

Let $R_{table}$ be the bit rate associated with the resolution S in the table given as an example here above.

$D_R$ is defined as the difference between $R_{table}$ and the encoding bit rate R.

$$D_R=R_{Table}-R$$

$D_K(t)$ is defined as the difference between K(t) and $K_m$ $$D_K(t)=K(t)-K_m$$

These two differences make it possible to determine F(t):

$$F(t)=\text{MIN}(0;a\times(D_K(t)+D_R)+b)$$

a and b are to be defined according to the filter, for example: a=0.003 and b=1.5

6.4 Description of the Complexity Estimation Module (STC Module)

FIG. 4 specifies the inputs and outputs of the complexity estimation module (STC module) 4 appearing in FIGS. 1 to 3.

6.4.1 General View

The STC module 4 links the complexity of a video with the number of bits needed for encoding the video with a given encoder and a fixed quantization step denoted as Qstep. The complexity K is defined as the product of the Qstep chosen and the number of associated bits C:

$$K=Q\text{step}\times C \qquad (1)$$

In a real-time system, it would be far too costly in computing time to carry out a first encoding to compute the number of bits really needed for the encoding. The STC module 4 actually makes an estimation of this.

As illustrated in FIG. 4, at the output of the STC module 4, an estimated complexity K(t) is associated with each frame I(t). In the example of an embodiment described in detail here below, the STC module 4 needs to know the current frame (denoted as I(t)) and the N next frames (denoted as I(t+1) to I(t+N)), to compute the estimated complexity K(t) of the frame I(t). To this end, a buffer 40 is integrated with the STC module 4.

We have: $0 \leq N \leq N_{max}$ (for example $N_{max}=60$).

The complexity K(t) associated with the frame I(t) is defined by:

$$K(t) = Q_{step} \times \frac{1}{A} \times \sum_{k=t}^{t+N} \sum_{T \in E_{Type}} (P(\text{Type } I(k)=T) \times C_{frame=T}(k)) \qquad (2)$$

where:

Qstep is the quantization step. It is not specified on what applies this quantization because it does not apply in practice on something. In practice, Qstep is a variable used for scaling. Typically, it is the result of an arbitrary choice of one of the possible quantization values used by the encoder;

A is a factor of standardization that reduces the complexity to a block-based complexity. A block is defined as a fixed-sized undersizing H×L of the frame;

$E_{Type}$={inter (P), intra (I), bi-predicted inter (B), bi-predicted and reference inter (Bref)}, constitute the set of possible types of encoding (i.e. the set of possible values of the variable T);

P(Type I(k)=T) is the probability that a frame I(k) is of the T type. Knowing the configuration of the encoder 10, this probability is easy to compute for each of the possible values of T (see discussion here below); and
$C_{frame=T}(k)$ is the estimated cost of a frame I(k) of a T type.

Specific Details on P(Type(I(k))=T).

The configuration of the encoder is known:
Period of the intra frames: for example Period=1 second;
Type of encoder (H264, Mpeg2, etc) and types of images.
For example, we consider an H264 type encoder which sequences the frames as follows: P Bref B B. This means that a frame of the "inter (P)" type is followed by a "bi-predicted and reference inter (Bref)" type frame and two "bi-predicted inter (B)" type frames.

The frequency f of the input sequence is known. For example f=25 fps. In the present example, the probability function P(Type(I(k))=T) will take the following values:

For T=intra, P(Type(I(k))=intra)=0.04 (a "intra (I)" type frame every 25 frames).

NOTE: If a frame is the first of a change of scene, it will be of a "intra" type in the encoder, and this adds a "intra" frame in addition to the periodic "intra" frames. If the STC module knows the position of the changes of scene (because of an external module or because of a detection integrated into the processor), it is then possible to improve the probability P(Type(I(k))=intra) in taking account of the additional "intra" frames placed in the changes of scene.

For T=inter (P), P(Type(I(k))=inter)=0.24 (6 frames of the "inter(P)" type in a group of 25).

For T=bi-predicted and reference inter (Bref), P(Type(I(k))=Bref)=0.24 (6 frames of the "bi-predicted and reference inter (Bref)" type in a group of 25).

For T=bi-predicted inter (B), P(Type(I(k))=B)=0.48 (12 frames of the "bi-predicted inter Bi (B)" type in a group of 25).

If the configuration of the encoder is unknown, the probability function can be defined with default values.

When N is equal to zero (N=0), the complexity K(t) is associated with the single frame I(t).

When N is different from zero (N≠0), the complexity K(t) is associated with the current frame I(t) but also with the group of N following frames. Indeed, in this case, the computation of the equation (2) gives an average complexity to a sliding window of N+1 frames (smoothing enabling a lower result to be obtained).

The complexity of each frame is thus computed by means of a complexity estimation module (STC module) 4 which is:
fast and simple: low-cost operations (possibility of real-time software application to high-definition video);
reliable: algorithm derived from learning which takes account of both temporal and spatial aspects of a video;
generic: the STC module 4 can be used with a real-time product whatever the output format of the capture module 2.

6.4.2 Principle of Estimation of $C_{frame=T}(t)$

One particular embodiment uses an H.264/MPEG4-10 AVC encoder.

The estimated cost of a frame is the sum of the estimated costs of the blocks of the frame. The estimated cost of a frame $C_{frame=T}(t)$ varies according to the type T of encoding: intra (I), inter (P), bi-predicted inter (B) or bi-predicted and reference inter (Bref).

$$C_{frame=T} = \Sigma_{blk=0}^{Nblock} C_{Block|T}(blk) \quad (3)$$

with:
$C_{Block|T}(blk)$ is the estimated cost of a block blk included in the frame, and for which the encoding type T is included in the group comprising "intra", "inter", "bi-predicted inter" and "bi-predicted and reference inter"; and N block is the number of blocks included in the frame.

A block can be included with a spatial prediction (Spatio) or a temporal prediction (Tempo). The estimated cost $C_{Bloc|T}(blk)$ of a block blk is either an estimated cost of encoding with a spatial prediction $C_{spatio}$, or an estimated cost of encoding with a temporal prediction $C_{tempo}$. If we consider the probability P(blk=tempo) that a block blk is encoded in temporal mode, we have:

$$C_{Block|T}(blk) = P(blk=tempo) \times C_{tempo}(blk) + (1-P(blk=tempo)) \times C_{spatio}(blk) \quad (4)$$

6.4.3 Temporal Cost

The process predicts the motion between the current image and a reference image. With no information on the sequencing of the images, the preceding image is taken as the reference image.

So as not to burden the process and in order to obtain real-time execution, the proposed technique uses for example a hierarchical motion estimation (HME) executed on 16×16 blocks. The principle of an HME is described for example in the following article: Chia-Wen Lin, Yao-Jen Chang, and Yung-Chang Chen, "Hierarchical Motion Estimation Algorithm Based on Pyramidal Successive Elimination", Proceedings of International Computer Symposium (ICS98), Workshop on Image Processing and Character Recognition, pp. 41-44, Tainan, Taiwan, Dec. 17-19, 1998.

This HME gives the following for each block blk:
a motion vector (MV(blk));
a prediction error which is the sum of the absolute differences (SAD (blk));
the cost of prediction of the motion vector (MVCost (blk)).

In using these metrics, we have been able to define the following model:

$$C_{tempo}(blk) = \alpha \times \frac{SAD(blk)}{Qstep} + \lambda \times MVCost(blk) \quad (5)$$

α and λ are predetermined parameters of the model, defined in a preliminary learning phase. Qstep is fixed.

6.4.4 Spatial Cost

We use for example a measurement of spatial energy to estimate the intra prediction of the encoder H264. The STC module 4 computes this energy (Energy(blk)) for each block blk of the current frame. Thus we define:

$$C_{spatio}(blk) = \beta \times \frac{Energy(blk)}{Qstep} \quad (6)$$

β is a predetermined parameter of the model defined in a preliminary learning phase.

6.4.5 Probability of a Type of Encoding

The distribution of probability of a block being encoded with a temporal prediction P(blk=tempo), can be modeled by an exponential function which depends on the SAD of the block and the type of image considered (or more specifically the type T of encoding of the frame in which the block blk is included). This probability is defined by:

$$P(blk = tempo \mid SAD(blk), Frame = I) = 0 \quad (7)$$

-continued $$P(blk = \text{tempo} | SAD(blk), \text{Frame} = B) = 1 \quad (8)$$

$$P(blk = \text{tempo} | SAD(blk), \text{Frame} = P \text{ or Frame} = Bref) = e^{-\frac{SAD^\gamma}{\sigma}} \quad (9)$$

with:
- Frame=I, if the frame I(t) is an "intra" frame;
- Frame=P, if the frame I(t) is an "inter" frame;
- Frame=B, if the frame I(t) is a "bi-predicted inter frame";
- Frame=Bref, if the frame I(t) is a "bi-predicted and reference inter" frame;
- γ and σ are predetermined parameters of the model determined in a preliminary learning phase.

In on alternative embodiment, the equation (8) is replaced by:

$$P(blk = \text{tempo} | SAD(blk), \text{Frame} = B) = e^{-\frac{SAD^{\gamma'}}{\sigma'}} \quad (10)$$

with γ' and σ' being predetermined parameters of the model defined (for the frames 8) in a preliminary learning phase.

6.5 Variants of the Module for Obtaining Information on Complexity

In the above description, the module 4 for obtaining a piece of complexity information is a module for estimating complexity (STC module) which enables an upstream application of a real-time encoder.

However, there are other possibilities for obtaining a piece of information on complexity associated with each frame of a scene.

In a first variant, the module 4 for obtaining information on complexity comprises an encoding module used to compute the complexity associated with a frame (t) by computing the number of bits really needed for encoding the frame I(t). For each frame, the filtering decision module 6 receives a computed complexity which it takes into account (inter alio) to determine the setpoint value of filtering.

In other words, in this first variant, a first encoding is done (in addition to the one performed by the encoder 10), whence the notion of a double encoding (also called a "double pass" encoding). This first encoding serves only to assess the complexity of each frame. This method is efficient but it is also very costly. Optimizations of this first variant consist for example in proposing an encoding that is simplified into a first pass.

A second variant is possible in cases of use where the capture module 2 receives an already compressed stream 1 (compressed by another encoder (not shown)) which is decoded and then re-encoded (by the encoder 10) in a different format or a different bit rate. The module 4 for obtaining information on complexity in this case simply comprises:
- a module for reading, in a compressed stream, a first piece of information specifying the size of the frames and a second piece of information specifying a quantization step Qstep (used by the aforesaid other encoder); and
- a module for computing the complexity associated with each frame by multiplying the size read (of this frame) by the quantization step Qstep read.

In other words, in this second variant, pieces of information on frame sizes and on Qstep in the compressed stream are retrieved and combined. This is a low-cost approach but is limited to situations where the capture module receives a compressed stream. In addition, the data streams are not reliable if this stream has undergone different successive encodings beforehand.

6.6 Other Uses of the Complexity Estimation Module (STC Module)

In the above description, the complexity estimation module (STC module) 4 forms part of a system for the dynamic reduction of entropy of a signal upstream to a data compression device (encoder) 10.

As illustrated in FIG. 5, the complexity estimation module 4 can also be used in a decision assistance system placed upstream to an encoder 10 (for example of the H264 or MPEG2 type) and giving the latter information used in the decision processes internal to any encoder.

For example, the complexity estimation module 4 gives the encoder 10 one or more of the following pieces of information
- the estimation of the complexity K(t) of a frame (see equation (2) detailed further above);
- the value of certain intermediate computation parameters such as for example the estimated cost of encoding with a spatial prediction $C_{spatio}$, and the estimated cost of encoding with a temporal prediction $C_{tempo}$.

The utility of each of these different pieces of information in the decision process of the encoder is described here below.

6.6.1 Complexity K(t)

As indicated further above, when N is different from zero (N≠0), the complexity K(t) is associated with the current frame I(t) but also with the following group of N frames (average complexity on a sliding window of N+1 frames). In other words, K(t) corresponds to the complexity of the group of N frames to come. This piece of data is used by the encoder in the bit-rate allocation algorithm or rate control algorithm: if the complexity to come increases, diminishes or remains constant, the bit rate allocated to the current frames will not be the same.

6.6.2 Spatial Cost (Intra Cost)

As indicated further above, the spatial cost (also called the intra cost) of a frame corresponds to the sum of the spatial costs of the blocks of the frame. The spatial cost $C_{spatio}$ of a block blk (i.e. the estimated cost of encoding with a spatial prediction) is defined by the equation (6) described in detail further above:

$$C_{spatio}(blk) = \beta \times \frac{\text{Energy}(blk)}{Qstep}$$

This piece of data is used by the encoder in the algorithm for allocating frames of the type I (intra). These frames are key frames in the stream, and are not encoded except by means of a spatial prediction. Depending on the spatial cost of a frame and the number of bits allocated to it, the algorithm decides on a quantization step for the frame.

6.6.3 Temporal Cost (Inter Cost)

The sequencer of the encoder is the part that decides on the number of Bs (i.e. the number of B type frames) in the GOP (group of pictures) sub-group to come. According to the encoder, whether H264 or MPEG2, there are different possibilities: no B, 1B, 2B, 3B, 5B, 7B, etc.

The Bs are very useful because their prediction is optimized and they facilitate the allocation of the bit rate because their size is often smaller. However, depending on the motion present in the sequence, they can be varyingly optimal: a difficult sequence with a great deal of motion will be more easily encoded with 1B while a greater number of Bs will be more efficient for a static sequence.

The temporal cost $C_{tempo}$ of a block blk (i.e. the estimated cost of encoding with a temporal prediction), also called "inter cost", gives this useful piece of information on motion to the sequencer. It is defined by the equation (5) described in detail further above:

$$C_{tempo}(blk) = \alpha \times \frac{SAD(blk)}{Qstep} + \lambda \times MVCost(blk)$$

The invention claimed is:

1. A system, which dynamically-reduces entropy of a signal upstream to a data compression device, said signal comprising a set of successive frames, said system comprising:
    an input receiving the signal comprising the set of successive frames;
    an output to the data compression device;
    a non-transitory computer-readable medium comprising instructions stored thereon; and
    a processing unit configured by the instructions to comprise:
    a filtering decision module configured to provide a setpoint value of filtering;
    a filtering module receiving the signal from the input and configured to filter the signal according to said setpoint value of filtering and generate a filtered signal on the output to the data compression device; and
    a module configured to obtain an estimated complexity K(t) for each frame I(t) of the signal, wherein said filtering decision module is configured to determine said setpoint value of filtering, for each frame of the signal, as a function of said estimated complexity and provide the determined setpoint value to the filtering module,
wherein said estimated complexity K(t) is defined by:

$$K(t) = Qstep \times \frac{1}{A} \times \sum_{k=t}^{t+N} \sum_{T \in E_{Type}} (P(\text{Type } I(k) = T) \times C_{frame=T}(k))$$

with:
  Qstep being a determined quantization step;
  A being a standardization factor;
  $E_{Type}$={inter (P), intra (I), bi-predicted inter (B), bi-predicted and reference inter (Bref)}, being the set of a possible encoding types, i.e. the set of possible values of the variable T;
  P(Type I(k)=T) being the probability that a frame I(k) is of a T type;
  $C_{frame=T}(k)$ being an estimated cost of a frame I(k) of a T type; and
  0≤N≤Nmax, N being the number of next frames I(t+1) to I(t+N), used with the frame I(t) to compute the estimated complexity K(t) of the frame I(t).

2. The system according to claim 1, wherein the setpoint value of filtering is a setpoint value of resolution and wherein the filtering module is adapted to carrying out a resizing of each frame, according to said setpoint value of resolution.

3. The system according to claim 1, wherein the setpoint value of filtering is a setpoint value of filtering strength and wherein the filtering module is adapted to carrying out a low-pass filtering of each frame, according to said setpoint value of filtering strength.

4. The system according to claim 1, wherein said estimated cost C(t) of the frame I(t) is defined by:

$$C_{frame=T} = \sum_{blk=0}^{Nblock} C_{Block|T}(blk)$$

with:
  $C_{Block|T}$(blk) being the estimated cost of a block blk included in the frame I(t) and the encoding type T of which is included in the group comprising: "intra", "inter", "bi-predicted inter" and "bi-predicted and reference inter"; and
  Nbloc is the number of blocks included in the frame I(t).

5. The system according to claim 4, wherein said estimated cost $C_{Block|T}$ of a block blk is defined by:

$C_{Block|T}$(blk)=P(blk=tempo)×$C_{tempo}$(blk)+(1−P(blk=tempo))×$C_{spatio}$(blk)

with:
  $C_{tempo}$ is a cost of encoding with a temporal prediction for the block blk;
  $C_{spatio}$ is a cost of encoding with a spatial prediction for the block blk;
  P(blk=tempo) is the probability that the block blk is encoded with a temporal prediction.

6. The system according to claim 5, wherein said cost $C_{tempo}$ is defined by:

$$C_{tempo}(blk) = \alpha \times \frac{SAD(blk)}{Qstep} + \lambda \times MVCost(blk)$$

with:
  α and λ being predetermined parameters;
  MV Cost (blk) being a cost of prediction of a motion vector for the block blk;
  SAD (blk) being a error of prediction of a motion vector for the block blk.

7. The system according to claim 5, wherein said cost $C_{spatio}$ is defined by:

$$C_{spatio}(blk) = \beta \times \frac{\text{Energy}(blk)}{Qstep}$$

with:
  β being a predetermined parameter;
  Energy (blk) being a measurement of spatial energy for the block blk.

8. The system according to claim 6, wherein said probability P(blk=tempo) is a function of SAD(blk) and the type T of encoding of the frame I(t) in which the block blk is included, and is defined by:

P(blk=tempo|SAD(blk),Frame=*I*)=0

P(blk=tempo|SAD(blk),Frame=*B*)=1

Or $$P(blk = \text{tempo} \mid SAD(blk), \text{Frame} = B) = e^{-\frac{SAD^{\gamma'}}{\sigma'}}$$

$$P(blk = \text{tempo} \mid SAD(blk), \text{Frame} = P \text{ or Frame} = Bref) = e^{-\frac{SAD^{\gamma}}{\sigma}}$$

with:
Frame=I, if the frame I(t) is an "intra" frame;
Frame=P, if the frame I(t) is an "inter" frame;
Frame=B, if the frame I(t) is a "bi-predicted inter" frame;
Frame=Bref, if the frame I(t) is a "bi-predicted and reference inter" frame;
$\gamma'$, $\sigma'$, $\gamma$ and $\sigma$ are predetermined parameters.

9. The system according to claim 1, wherein the module for obtaining the estimated or computed complexity comprises an encoding module enabling the computation of the complexity associated with a frame I(t) by computing the number of bits really necessary for encoding the frame I(t) and wherein said filtering decision module is adapted to determining said setpoint value of filtering for a frame I(t) as a function of the computed complexity.

10. The system according to claim 1, wherein the module for obtaining the estimated or computed complexity comprises:
a reading module for reading, in said signal, a size C(t) of a frame I(t) and a quantization step Qstep;
a module for computing the complexity associated with the frame I(t) by multiplying the size read C(t) by the quantization step Qstep.

11. A method comprising:
dynamic reduction of entropy of a signal upstream to a data compression device, said signal comprising a set of successive frames, and said dynamic reduction comprising:
receiving the signal comprising the set of successive frames by a dynamic entropy reduction device;
filtering the signal, by the dynamic entropy reduction device, according to a setpoint value of filtering to produce a filtered signal;
providing the filtered signal from the dynamic entropy reduction device to the data compression device; and
for each frame I(t) of the signal:
obtaining an estimated complexity K(t); and
determining, by the dynamic entropy reduction device, the setpoint value of filtering as a function of the estimated complexity,
wherein said estimated complexity K(t) is defined by:

$$K(t) = Q_{step} \times \frac{1}{A} \times \sum_{k=t}^{t+N} \sum_{T \in E_{Type}} (P(\text{Type } I(k) = T) \times C_{frame=T}(k))$$

with:
Qstep being a determined quantization step;
A being a standardization factor;
$E_{Type}$={inter (P), intra (I), bi-predicted inter (B, bi-predicted and reference inter (Bref)}, being the set of a possible encoding types, i.e. the set of possible values of the variable T;
P(Type I(k)=T) being the probability that a frame I(k) is of a T type;
$C_{frame=T}(k)$ being an estimated cost of a frame I(k) of a T type; and
0≤N≤Nmax, N being the number of next frames I(t+1) to I(t+N), used with the frame I(t) to compute the estimated complexity K(t) of the frame I(t).

12. The method according to claim 11, wherein the setpoint value of filtering is a setpoint value of resolution and wherein the filtering step comprises a resizing of each frame, according to said setpoint value of resolution.

13. The method according to claim 11, wherein the setpoint value of filtering is a setpoint value of filtering strength and wherein the filtering step comprises a low-pass filtering of each frame according to said setpoint value of filtering strength.

14. A computer-readable, non-transient storage medium storing a computer program comprising a set of executable instructions executable by a computer or a processor of a dynamic entropy reduction device to implement a method comprising:
dynamic reduction of entropy of a signal upstream to a data compression device, said signal comprising a set of successive frames, and said dynamic reduction comprising:
filtering, by the dynamic entropy reduction device, the signal according to a setpoint value of filtering to produce a filtered signal;
providing the filtered signal from the dynamic entropy reduction device to the data compression device; and
for each frame I(t) of the signal:
obtaining an estimated complexity K(t); and
determining, by the dynamic entropy reduction device, the setpoint value of filtering as a function of the estimated complexity,
wherein said estimated complexity K(t) is defined by:

$$K(t) = Q_{step} \times \frac{1}{A} \times \sum_{k=t}^{t+N} \sum_{T \in E_{Type}} (P(\text{Type } I(k) = T) \times C_{frame=T}(k))$$

with:
Qstep being a determined quantization step;
A being a standardization factor;
$E_{Type}$={inter (P), intra (I), bi-predicted inter (B), bi-predicted and reference inter (Bref)}, being the set of a possible encoding types, i.e. the set of possible values of the variable T;
P(Type I(k)=T) being the probability that a frame I(k) is of a T type;
$C_{frame=T}(k)$ being an estimated cost of a frame I(k) of a T type; and
0≤N≤Nmax, N being the number of next frames I(t+1) to I(t+N), used with the frame I(t) to compute the estimated complexity K(t) of the frame I(t).

\* \* \* \* \*

UNITED STATES PATENT AND TRADEMARK OFFICE
CERTIFICATE OF CORRECTION

PATENT NO. : 9,635,362 B2
APPLICATION NO. : 14/181242
DATED : April 25, 2017
INVENTOR(S) : Marine Sorin et al.

It is certified that error appears in the above-identified patent and that said Letters Patent is hereby corrected as shown below:

In the Specification

In the Equations:

Column 4, Lines 12-17, please replace the listed equation with the following:

$$K(t) = Q_{step} \times \frac{1}{A} \times \sum_{k=t}^{t+N} \sum_{T \epsilon E_{Type}} \left( P(Type\ I(k) = T) \times C_{frame=T}(k) \right)$$

Column 10, Lines 46-51, please replace equation (2) with the following:

$$(2) \quad K(t) = Q_{step} \times \frac{1}{A} \times \sum_{k=t}^{t+N} \sum_{T \epsilon E_{Type}} \left( P(Type\ I(k) = T) \times C_{frame=T}(k) \right)$$

Column 11, Lines 63-64, please replace equation (3) with the following:

$$(3) \quad C_{frame=T} = \sum_{blk=0}^{Nblock} C_{Block|T}(blk)$$

In the Claims

In the Equations:

Column 15, Lines 41-46, please replace the listed equation with the following:

$$K(t) = Q_{step} \times \frac{1}{A} \times \sum_{k=t}^{t+N} \sum_{T \epsilon E_{Type}} \left( P(Type\ I(k) = T) \times C_{frame=T}(k) \right)$$

Column 17, Lines 47-52, please replace the listed equation with the following:

$$K(t) = Q_{step} \times \frac{1}{A} \times \sum_{k=t}^{t+N} \sum_{T \epsilon E_{Type}} \left( P(Type\ I(k) = T) \times C_{frame=T}(k) \right)$$

Signed and Sealed this
Twenty-sixth Day of February, 2019

Andrei Iancu
*Director of the United States Patent and Trademark Office*

CERTIFICATE OF CORRECTION (continued)
U.S. Pat. No. 9,635,362 B2

Column 18, Lines 38-44, please replace the listed equation with the following:

$$K(t) = Q_{step} \times \frac{1}{A} \times \sum_{k=t}^{t+N} \sum_{T \epsilon E_{Type}} \left( P(Type\ I(k) = T) \times C_{frame=T}(k) \right)$$